April 23, 1957 R. G. TETRO 2,789,673
DIRECTIONAL DRIVE CONTROL FOR SELF-STARTING SYNCHRONOUS MOTOR
Filed May 26, 1954 3 Sheets-Sheet 1
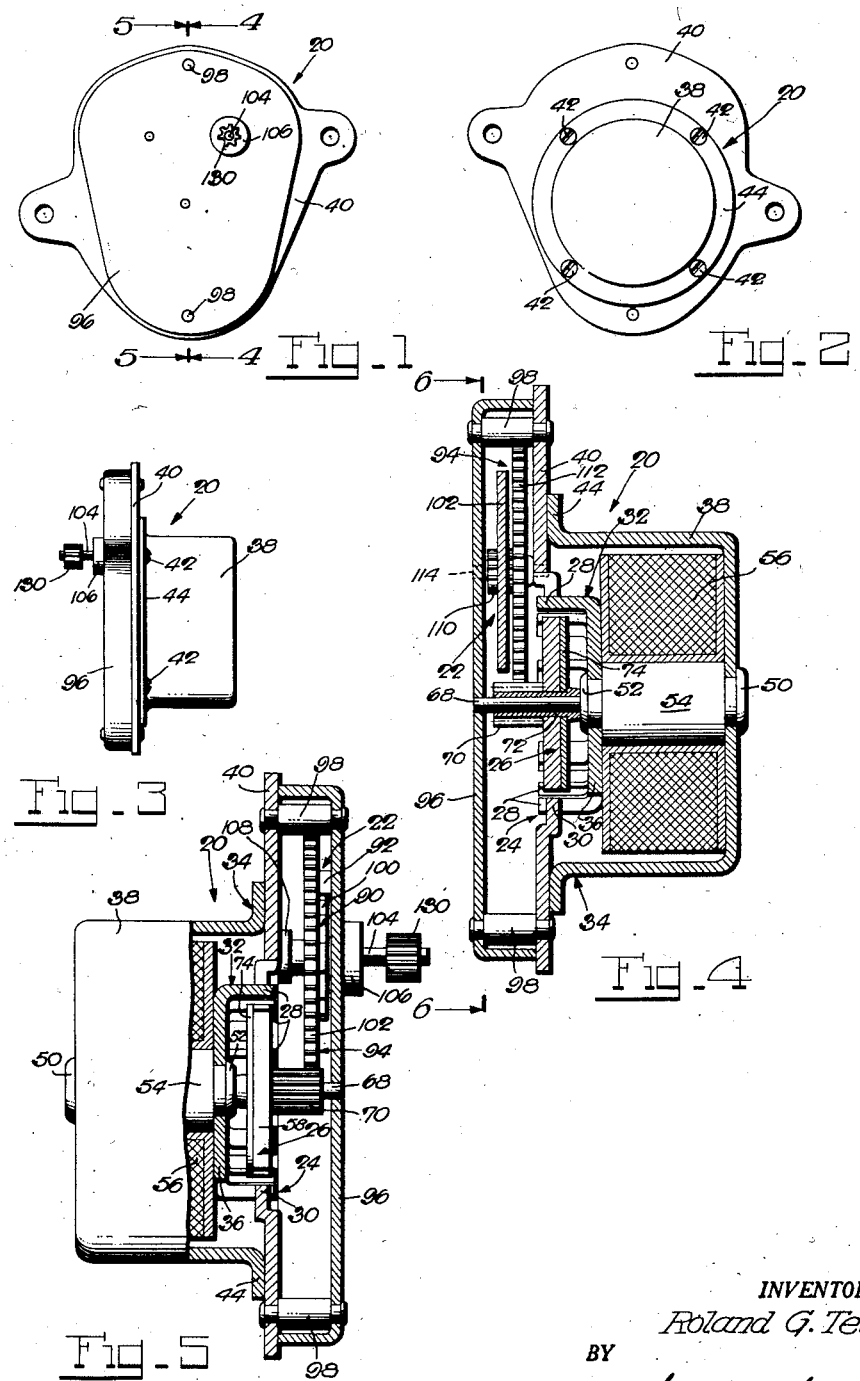
INVENTOR.
Roland G. Tetro
BY
Steward + Horough
Attorneys.

INVENTOR.
Roland G. Tetro
BY
Attorneys.

April 23, 1957 R. G. TETRO 2,789,673
DIRECTIONAL DRIVE CONTROL FOR SELF-STARTING SYNCHRONOUS MOTOR
Filed May 26, 1954 3 Sheets-Sheet 3

INVENTOR.
Roland G. Tetro
BY
Steward & Sprengel
Attorneys.

United States Patent Office 2,789,673
Patented Apr. 23, 1957

2,789,673

DIRECTIONAL DRIVE CONTROL FOR SELF-STARTING SYNCHRONOUS MOTOR

Roland G. Tetro, Bristol, Conn., assignor to The E. Ingraham Company, Bristol, Conn., a corporation of Connecticut Application May 26, 1954, Serial No. 432,493

19 Claims. (Cl. 192—4)

This invention relates generally to self-starting synchronous motors, and more particularly to synchronous motors with directional drive controls.

Self-starting synchronous motors may start and run in either direction unless they are provided with directional drive controls. Some of these drive controls are of a type which permit the rotor to start in either direction and cause the same to reverse or rebound into the right direction on each start in the wrong direction. While the previous drive controls of this type are satisfactory insofar as their performance is concerned, they are deficient in other respects. Thus, these previous drive controls are subject to rapid wear or undue noise, or both, and some of these controls interfere with the uniform drive of the motors and require for their constant operation an excessive amount of the motor torque, while others fail to perform, or are unreliable in their performance, in the smaller and inexpensive higher-speed motors of fewer field poles.

It is an object of the present invention to provide for a self-starting synchronous motor a directional drive control of the rebound type which has none of the aforementioned deficiencies of the previous drive controls of the same type.

It is another object of the present invention to provide for a self-starting synchronous motor a directional drive control of this type which on a wrong-direction start of the rotor reverses the latter for all practical intents and purposes instantaneously, yet allows the rotor more wrong-directional play than previous drive controls of this type for its lively start in the wrong direction and, hence, energetic rebound into the right direction, thereby to achieve assured reversal and continued drive in the right direction of the rotor on each wrong-directional start of the same even in smaller and less expensive motors of fewer field poles.

It is a further object of the present invention to provide for a self-starting synchronous motor a directional drive control of this type which includes a rotor-driven gear train the backlash in which is relied on for achieving the aforementioned wrong-directional play of the rotor, and which may be designed to have, almost simultaneously with the quick take-up of this backlash on each wrong-directional start of the rotor, a positive rebound action which is transmitted through this gear train to the rotor and reverses the latter for its continued drive in the right direction.

Another object of the present invention is to provide for a self-starting synchronous motor a directional drive control of this type of which the aforementioned gear train is interposed between the rotor and the output shaft of the motor, thereby to achieve reversal of the rotor on each wrong-directional start thereof without compelling the same to drag the load on the motor, and instead imposing this load on the rotor after the same is reversed and well on its way in the right drive direction.

A further object of the present invention is to provide for a self-starting synchronous motor a directional drive control of this type of which the aforementioned gear train is of the reduction type, so that the rebound action transmitted therethrough to the rotor starts the latter in the right direction at such rapid acceleration that it will assuredly continue its correct drive regardless of the number of field poles of the rotor.

It is another object of the present invention to provide in the directional drive control of this type a simple ratchet wheel and pawl of which the former rebounds from the latter on each wrong-directional start of the rotor and is carried by one of the gears of the aforementioned train, while the pawl is carried by the motor housing, so that the reactive forces from the rebound action will not appreciably jar the rotor and, hence, will have no adverse effect upon its closely maintained gap from the associated field poles.

Another object of the present invention is to provide for a self-starting synchronous motor a directional drive control of this type of which the aforementioned reduction gear train has multiple reduction stages and the aforementioned ratchet wheel is carried by the slowest gear of the train, thereby not only affording maximum wrong-directional play of the rotor commensurate with the entire backlash in the gear train and, hence, achieving even more lively and assured reversal of the rotor into its correct drive direction, but also minimizing even further any jarring effect of the reactive forces from the rebound action on the rotor and its mounting.

It is a further object of the present invention to provide for a self-starting synchronous motor an alternative form of directional drive control of this type which includes the aforementioned ratchet wheel and pawl, but relies for the required wrong-directional play of the rotor, not on the backlash in a gear train between the rotor and output shaft of the motor, but rather on a limited angular lost motion connection between the ratchet wheel and a disc which is driven by the rotor, so that the pawl locks the ratchet wheel as before, on a wrong-directional start of the rotor, but it is the rebound of the disc from the locked ratchet wheel, after the take-up of the lost motion between them, which causes reversal of the rotor into its right drive direction, thereby adapting the present pawl and ratchet type directional drive control to motors which may be gearless or require exceptionally condensed construction.

It is another object of the present invention to have the disc in the aforementioned alternative directional drive control in the form of a gear which is in mesh with another gear on the rotor shaft, so that the backlash between these gears augments the lost motion between the ratchet wheel and associated gear and allows even more beneficial wrong-directional play of the rotor.

A further object of the present invention is to provide either of the aforementioned directional drive controls with a pivoted double-ended pawl the ends of which are alternately cammed into and out of the path of the teeth of the ratchet wheel by the teeth themselves during normal drive of the rotor in the right direction, while either pawl end will be cammed by these teeth into and will remain in the path of the nearest tooth for the rebound of the ratchet wheel from the pawl on each wrong-directional start of the rotor, thereby eliminating a spring and its anchorage for the actuation of the pawl and also reducing the torque losses in the motor.

Another object of the present invention is to obtain the limited lost motion between the disc and ratchet wheel parts of the aforementioned alternative directional drive control by providing a simple pin and slot connection between these parts, and to rely on the friction between the ratchet teeth and double-ended pawl ensuing from their aforementioned camming action, for holding back the ratchet wheel on each reversal of the rotor into its right drive direction until the lost motion between the above parts requisite for the next self-start of the rotor in the wrong direction is restored, thereby eliminating the need for any spring means to restore this lost motion between the parts after each wrong-directional start of the rotor.

Further objects and advantages will appear to those skilled in the art from the following, considered in conjunction with the accompanying drawings.

In the accompanying drawings, in which certain modes of carrying out the present invention are shown for illustrative purposes:

Fig. 1 is a front view of a motor embodying the directional drive control of the present invention;

Figs. 2 and 3 are rear and side views, respectively, of the same motor;

Figure 6:
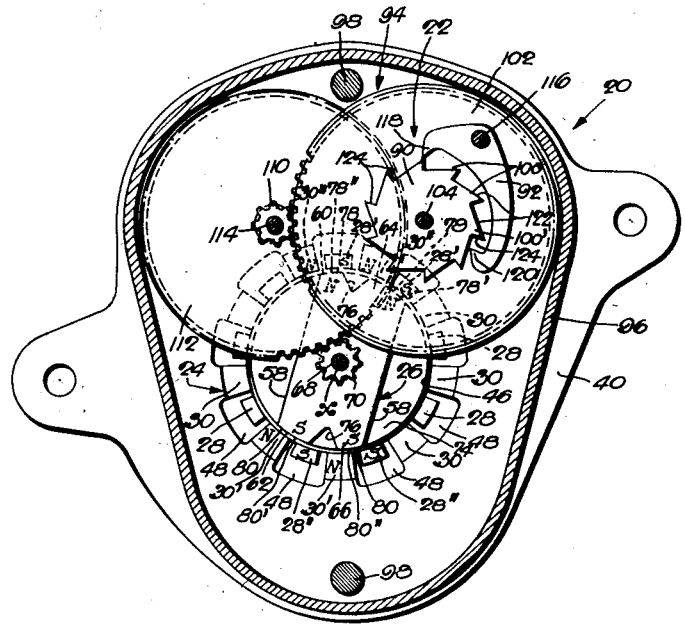
Figure 7:
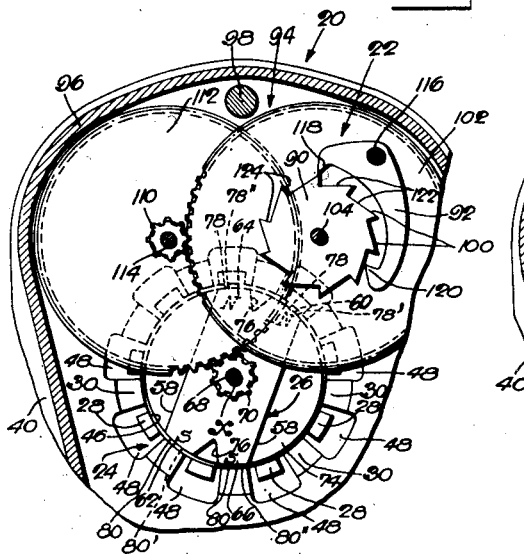
Figure 8:
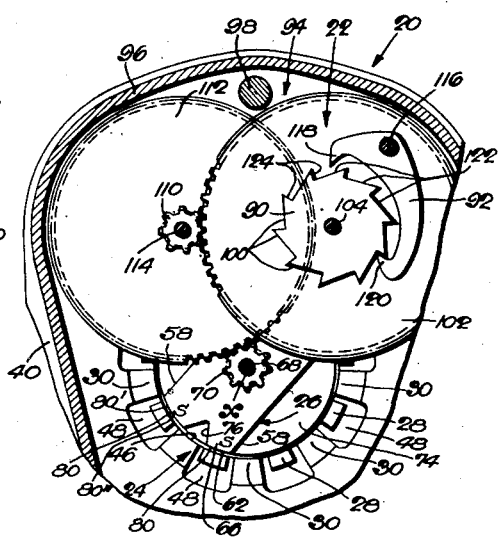
Figures 9, 10:
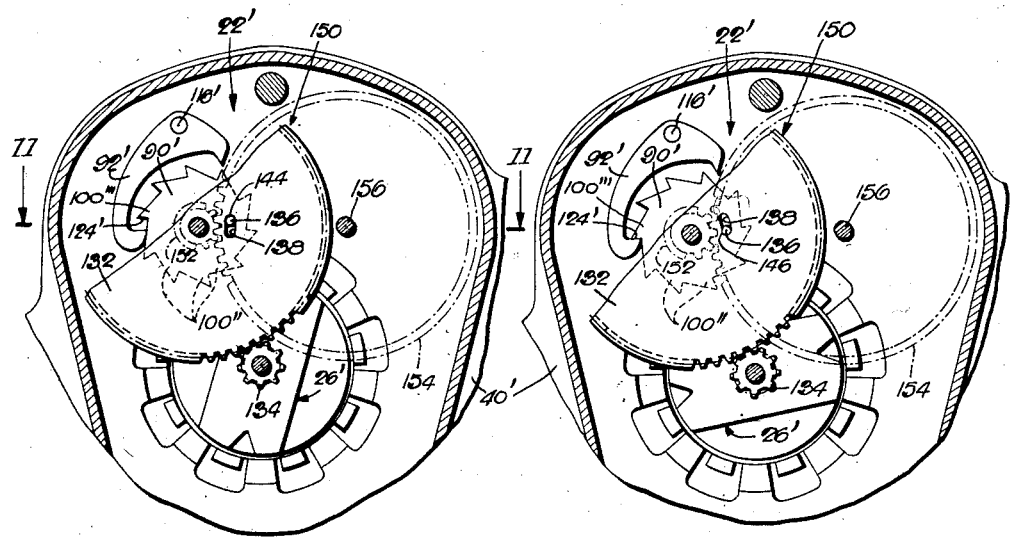
Figures 11, 12:
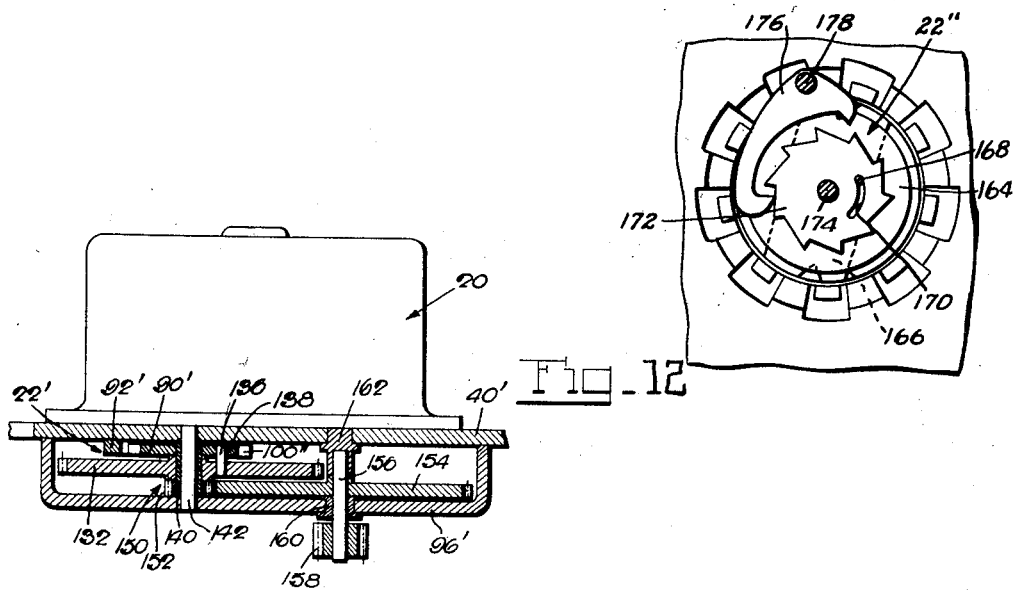

Figs. 4 and 5 are enlarged sections through the motor, taken on the lines 4—4 and 5—5, respectively, of Fig. 1;

Fig. 6 is a section taken on the line 6—6 of Fig. 4;

Figs. 7 and 8 are fragmentary sections similar to Fig. 6, but showing certain parts in different operating positions, respectively;

Fig. 9 is a fragmentary section through a part of a motor embodying the directional drive control of this invention in a modified manner;

Fig. 10 is a fragmentary section similar to Fig. 9, but showing the parts of the modified directional drive control in different operating positions;

Fig. 11 is a section taken on the line 11—11 of Fig. 9, and

Fig. 12 is a fragmentary view of a directional drive control embodying the present invention in a further modified manner.

Referring to the drawings, and more particularly to Figs. 1 to 8 thereof, the reference numeral 20 designates a self-starting synchronous motor having a directional drive control 22 which forms the subject matter of the present invention. The motor 20, which may be like or similar to that shown and described in the prior patent to Walter Kohlhagen, No. 2,677,776, dated May 4, 1954, comprises a field structure 24 and an armature or rotor 26. The field structure 24 comprises two sets of field poles 28 and 30 which are provided on separate field casing sections 32 and 34, respectively. The casing section 32 is in the form of a disc 36 having struck-up prongs which are equi-angularly spaced and constitute the field poles 28. The casing section 34 comprises a cup member 38 and a plate member 40 secured by screws 42, for instance, to a flange 44 on the cup member 38. The plate member 40 is died out to provide a circular opening 46 for the rotor 26, and a plurality of equi-angularly spaced tooth-like formations which constitute the field poles 30 and are separated from each other by gaps 48. The field poles 28 and 30 are in this instance of the same widths.

The casing sections 32 and 34 are suitably secured, in this instance by riveting as at 50 and 52, to the opposite ends of a post or core 54 (Fig. 4), so that the field poles 28 and 30 are arranged in alternate order and in substantial circumferential alignment with each other in the fashion shown in Fig. 6. More particularly, the field poles 28 project into the gaps 48 between successive field poles 30 and are equally spaced from the latter.

As shown in Fig. 4, a field coil 56 surrounds the core 54 and is interposed between the casing sections 32 and 34. Single-phase alternating current may be supplied to this coil from any suitable source. The casing sections 32 and 34 and the core 54 are made of any suitable non-permanent magnetic material. Due to their attachment to the opposite ends of the core 54, the casing sections 32 and 34 are, during energization of the field coil 56, magnetized at any given instant so that they are of opposite polarity. Accordingly, the alternate field poles 28 and 30 are of opposite polarity at any given instant, and their polarity changes in phase with the alternating current supplied to the field coil 56.

Referring now to the armature or rotor 26, the same is in the form of an elongated plate having substantially parallel straight side-edges 58 and opposite end-edges 60 and 62 which extend concentrically with respect to the rotary axis $x$ of the rotor (Fig. 6). The rotor 26 is a permanent magnet having opposite poles 64 and 66.

Suitably mounted on a forwardly projecting shank 68 on the core 54 is a pinion 70 which forms part of a gear train to be described. In the present instance, the rotor 26 is suitably mounted on a hub portion 72 of the pinion 70 (Fig. 4). Preferably secured to the rotor 26 is a disc 74 of non-magnetic material which serves as a fly-wheel to prevent surging of the rotor and instead compel it to turn uniformly when the field coil is energized.

In order to lend to the instant rotor 26 self-starting characteristics, its opposite poles 64 and 66 are notched at 76 to divide them into pairs of spaced pole-faces 78 and 80, respectively. The notches 76 in the rotor poles 64 and 66 are preferably V-shaped and are substantially of the same width as any of the field poles 28 or 30. The notches 76 in the rotor poles 64 and 66, while arranged diametrically opposite each other, are offset from the respective centers of these rotor poles. Thus, the diagonally opposite pole faces 78' and 80' of the respective rotor poles 64 and 66 are wider than the diagonally opposite pole faces 78" and 80" thereof (Fig. 6). Further, the over-all width of each of the rotor poles 64 and 66 exceeds the over-all spacing of three consecutive field poles 28, 30 (Fig. 6). Also, each of the pole faces 78" and 80" of smaller width must be of a width in excess of that of any field pole 28 or 30.

As usual, the rotor 26 will, on deenergization of the field coil 56 and just before coming to rest, seek and assume the nearest one of a number of angularly spaced idle or starting positions of minimum reluctance in each of which its pole faces 78 and 80 are adjacent the greatest possible mass of field pole material. Due to the described widths of the rotor poles 64 and 66 and the formation of the pole faces 78 and 80 of different widths thereat by the off-center notches 76 therein, the rotor 26 will always come to rest in any one of a number of starting positions in which its notches 76 will inevitably be out of alignment with the adjacent field poles 28 and 30. Thus Fig. 6 shows the rotor 26 in one of its possible starting positions in which the notches 76 are clearly out of alignment with any of the adjacent field poles 28 and 30, and the pole faces 78 and 80 are in toto substantially adjacent a maximum possible mass of field pole material. In this connection, it will be appreciated that it is only by virtue of the before-mentioned widthwise relation of the rotor poles 64 and 66 and of the notches 76 therein and smaller-width pole faces 78" and 80" thereof to each other and to the widths and spacing of the field poles, that the pole faces 78 and 80 of the rotor may, in any idle position of minimum reluctance of the latter, be adjacent a maximum mass of field pole material which involves portions of four consecutive field poles and permits the described disalignment of the notches 76 from the adjacent field poles in any idle rotor position.

In distinct contrast to these idle or starting positions of the rotor 26, the latter will, when running on energization of the field coil 56, have successive running positions of minimum reluctance, i. e. positions in which maximum magnetic forces occur and in each of which the notches 76 are in alignment with the oppositely polarized field poles 28 and 30 of a pair as shown in Fig. 7. An inspection of the momentary running position of minimum reluctance of the rotor 26 in Fig. 7 will further convince that the rotor would never come to rest in this position, because quite evidently a mass of field pole material distinctly less than a possible maximum mass thereof then confronts the pole faces 78 and 80. It is thus obvious that the rotor 26 will in any of its possible starting positions of minimum reluctance be inevitably spaced from any one of its momentary running positions of minimum reluctance, wherefore the rotor will, on each reenergization of the field coil 56, assuredly be drawn in either direction into the nearest running position of minimum reluctance and thus start its normal run in synchronism with the alternating current supplied to the field coil.

Since the motor has, in the present instance, an odd number of field poles 28 and 30, the pole faces 78 and 80 of the present permanent-magnet rotor 26 must be of opposite polarities as will clearly appear from the following. Thus, assuming that the pole faces 78 and 80 of the rotor 26 are of north and south polarities, respectively, and that the rotor is in the idle position shown in Fig. 6, and assuming further that the field coil 56 be suddenly supplied with current and that the polarities of the field poles 28 and 30 be for the first time as indicated in Fig. 6, it then follows that the south field poles 28' and north field poles 30' will attract the adjacent pole faces 78 and 80, respectively, of the rotor, resulting in clockwise rotation of the latter from the starting position in Fig. 6 into the first momentary running position of minimum reluctance shown in Fig. 7. Supplementing the rotor-starting action of the south and north field poles 28' and 30' are the north and south field poles 30'' and 28'', respectively, which in the instant example will repel the adjacent north and south pole faces 78 and 80, respectively, of the rotor and compel the latter to turn clockwise into the position shown in Fig. 7. Thus, with the initial polarities of the field poles 28 and 30 being as indicated in Fig. 6, the rotor 26 will self-start in clockwise direction. Contrariwise, if the initial polarities of the field poles 28 and 30 would, on reenergization of the field coil 56, be opposite to those indicated in Fig. 6, the rotor 26 would start in counter-clockwise direction, as will be readily understood. Once started in either direction, however, the rotor 26 will continue to run in the same direction in phase with the alternating current and, accordingly, in phase with the reversals of the polarities of the field poles 28 and 30. The motor described herein forms no part of the present invention, and the same is in all essential respects like that in the aforementioned Patent No. 2,677,776. It is to be understood, however, that the drive control 22 of the present invention, presently to be described, is in its use and in the performance of its designated function not at all limited to the exemplary motor shown.

In accordance with the present invention, the directional drive control 22 is provided in order to reverse the rotor 26 on each wrong-directional self-start of the same and compel it to continue its drive in the right direction. The drive control 22 comprises, in the present instance, a ratchet wheel 90, a cooperating pawl 92, and a gear train 94 which includes the aforementioned gear 70. All the parts of the gear train 94 are enclosed in a casing 96 which is mounted on the plate member 40 of the motor by pillars 98 (Figs. 1 and 4). The ratchet wheel 90 with its teeth 100 rotates in unison with a gear 102 (Figs. 6 to 8), and both are carried by a staff 104 which is journalled in bearings 106 and 108 on the casing 96 and the plate member 40 of the motor, respectively (Fig. 5). The gear 102 is in permanent mesh with a pinion 110 which turns in unison with a gear 112 that is in permanent mesh with the pinion 70. The pinion 110 and gear 112 are carried by a staff 114 which is journalled with its ends in the casing 96 and the plate member 40 of the motor, respectively (Fig. 4). Thus, the pinions and gears of the entire train 94 are interposed between the rotor 26 and ratchet wheel 90.

The pawl 92, which is pivoted on a pin 116 on the casing 96 and interposed between the latter and the gear 102 (Fig. 5), has in this instance two acting ends 118 and 120 which alternately cooperate with the teeth 100 of the ratchet wheel 90. Thus, is follows that the inclined tops 122 of the ratchet teeth will alternately cam the ends 118 and 120 of the pawl 92 out of the way when the ratchet wheel 90 turns counter-clockwise as viewed in Fig. 6, but the stop flank 124 of the ratchet tooth 100 nearest either pawl end 118 or 120 will become locked with the latter when the ratchet wheel turns in the opposite direction, i. e. clockwise as viewed in Fig. 6. Accordingly, since the pawl 92 permits in the present example counter-clockwise rotation of the ratchet wheel 90, the normal drive of the rotor 26 in the right direction is also counter-clockwise as viewed in Fig. 6, i. e. the direction commensurate with that of the ratchet wheel 90 permitted by the pawl 92. Accordingly, if the rotor 26 should, on reenergization of the field coil 56, self-start in the right direction, i. e. counter-clockwise as viewed in Fig. 6, the directional drive control 22 need not and will not reverse the rotor but will permit the same to continue its drive in the direction in which it self-started.

Assuming now that the rotor 26 will, on reenergization of the field coil 56, self-start from the exemplary rest position in Fig. 6 in the wrong direction, i. e. clockwise as viewed in Fig. 6, the normal backlash in the pinions and gears of the train 94 will permit such wrong-directional self-start of the rotor considerably beyond its first running position of minimum reluctance (Fig. 7) without turning the ratchet wheel 90. In fact the rotor 26 will in the present instance be turned, wrong-directionally, all the way into the angular position shown in Fig. 8 before the backlash in the gear train 94 and the exemplary initial play (Fig. 6) between the stop flank 124 of the ratchet tooth 100' and the end 120 of the pawl 92 are taken up. It is only after this backlash and play are taken up on this wrong-directional self-start of the rotor that the stop flank 124 of the ratchet tooth 100' momentarily locks with the adjacent pawl end 120 (Fig. 8) and then rebounds therefrom to reverse the entire gear train 94 and with it the rotor 24, with the result that the latter will continue its drive in the right direction in phase with the alternating current supplied to the field coil 56.

The backlash in the pinion and gears of the train 94 is solely relied on to permit the rotor 26 sufficient angular play for an assured self-start of the latter in the wrong direction whenever it happens, without turning the ratchet wheel 90, thereby to prepare for the contingency of having either pawl end already in locking relation with the stop flank of the nearest ratchet tooth in any idle position of the rotor. Thus, the backlash in the gear train 94 is in any event adequate to permit an assured self-start and sufficiently sustained drive of the rotor in the wrong direction to cause its assured reversal on the rebound of the ratchet wheel from either pawl end even if the latter should engage the stop flank of the nearest ratchet tooth in the idle position of the rotor from which the latter self-started in the wrong direction. While the wrong-directional drive of the rotor 26 after any wrong-directional self-start thereof is thus sufficiently sustained in any event to achieve lively reversal of the rotor and assured continuous drive of the same in its normal direction on the ensuing rebound of the ratchet wheel from the pawl, this sustained wrong-directional drive of the rotor is nevertheless so brief in point of time that the latter is on each wrong-directional self-start reversed instantaneously for all practical intents and purposes.

The gear train 94 is in its preferred form of the reduction type, having in this instance two successive reduction stages constituted by the pinions and gears 70, 112 and 110, 102. Since the ratchet wheel 90 is carried by the slowest gear 102 of the reduction train 94, it follows that the rebound of the ratchet wheel 90 from the pawl 92 on each wrong-directional start of the rotor 26 causes especially lively reversal of the latter and, hence, its assured continuous drive in the right direction. Moreover, the ratchet-carrying staff 104 is, in the present instance, the output shaft of the motor, being to that end provided with a drive pinion 130, wherefore any load on the motor will not impede a wrong-directional self-start of the rotor and, instead, will permit wrong-directional self-start of the same with sufficient impetus to assure its reversal and continued drive in the right direction. Also, since the ratchet wheel and pawl are carried by the motor and casing thereon, the reactive forces from their rebound action have little tendency, if any, to jar the rotor and its mounting and, hence, to vary the closely maintained gap between the former and the field poles. The instant pawl 92, by being double-ended and cam-operated by the ratchet teeth for overriding them or locking with them, as explained, requires no spring for its performance, although it is fully within the purview of this invention to substitute for the present pawl a conventional spring-urged pawl with a single actuating end. However, the present double-ended pawl is preferred because it does not require an actuating spring and, hence, is devoid of the considerable friction between it and the ratchet wheel which is reliable actuating spring would entail and which may well interfere with the uniform drive of the rotor. Moreover, the instant double-ended pawl, by being cam-operated for its entire performance, is positive in action and, hence, more reliable in its performance in the long run than a spring-urged pawl.

Reference is now had to Figs. 9 to 11 which show a modified directional drive control 22' for the same motor 20. While the hereinbefore described directional drive control 22 relies on the backlash in the gear train 94 to permit sufficient angular play of the rotor for its wrong-directional self-start without turning the ratchet wheel, the instant modified directional drive control 22' relies for the achievement of the same end on a driving connection of limited lost motion between a rotor-driven part 132 and the ratchet wheel 90'. The rotor-driven part 132 is in this instance a gear which through intermediation of a pinion 134 is drivingly connected with the rotor 26'. The limited lost-motion driving connection between the gear 132 and ratchet wheel 90' is in this instance provided by a pin 136 on the latter and an arcuate slot 138 in the former into which the pin 136 extends. The gear 132 may be fast on a sleeve 140 which turns on a fixed pin 142 (Fig. 11), while the ratchet wheel 90' may be freely rotatable on the sleeve 140 to afford the requisite angular lost motion between the latter and the gear 132. The pawl 92' may be pivoted on a pin 116' on the plate member 40' of the motor.

During normal drive of the rotor 26' in the right direction, counter-clockwise as viewed in Fig. 9, the pawl 92' will, on the ensuing clockwise rotation of the ratchet wheel 90', override the ratchet teeth 100''. Since the normal drive of the ratchet wheel 90' originates at the rotor 26' and the alternate camming actions between the ends of the pawl 92' and the ratchet teeth 100'' on the wheel 90' entail some slight friction between them, it follows that the rotor must drag the ratchet wheel against this slight friction, with the result that the driving connection between the gear 132 and associated ratchet wheel 90' is between the pin 136 and the end 144 of the slot 138 as shown in Fig. 9.

On a wrong-directional start of the rotor 26', in this example clockwise as viewed in Fig. 9, the gear 132 will be turned counter-clockwise and the ratchet wheel 90' will be dragged along until either pawl end engages the stop flank of the nearest ratchet tooth 100'', in this instance the stop flank 124' of the ratchet tooth 100''' (Fig. 10). The ratchet wheel 90' is then stopped while the gear 132 continues its wrong-directional rotation until the lost motion afforded by the pin and slot connection 136, 138 is taken up, at which time the opposite end 146 of the slot 138 in the gear 132 will run against the pin 136 on the locked ratchet wheel and rebound therefrom, causing thereby reversal of the rotor and its continued drive in the right direction.

Since the ratchet wheel 90' is in this instance drivingly connected with the rotor 26' by means of the gear 132 and pinion 134, their backlash augments the lost motion of the pin and slot connection 136, 138 and thus affords additional angular play to the rotor for a wrong-directional self-start of the same without turning the ratchet wheel. The pinion 134 and gear 132 form, in the present example, part of a reduction gear train 150 which further includes a pinion 152 turning in unison with the gear 132, and another gear 154 on a staff 156 that is in this instance the output shaft of the motor, carrying to this end a drive pinion 158 (Fig. 11). The output shaft 156 is journalled in bearings 160 and 162 on the casing 96' and the plate member 40' of the motor, respectively.

The modified drive control 22' just described, while including the pinion 134 and gear 132, may well be further modified by being made gearless, if desired. Thus, this further modified drive 22'' (Fig. 12) has a disc part 164 or the like turn in unison with the rotor 166, and there is provided a lost-motion pin and slot connection 168, 170 between the disc part 164 and a ratchet wheel 172 which is independently turnable coaxially of the rotor. The ratchet wheel 172 may directly be mounted on the output shaft 174 which may conveniently be journalled in the motor cover casing (not shown), while the pawl 176 may turn on a depending stud 178 in the cover casing. Hence, the modified drive control of Fig. 12 may readily be adapted for gearless motors or motors which require exceptionally condensed construction.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. A directional drive control for a self-starting synchronous motor having a rotor, comprising a rotor-driven element; a wheel part having ratchet teeth; a cooperating pawl part, one of said parts being mounted for rotary movement relative to the other part so as to maintain their cooperative relationship; and a driving connection between said element and said one part providing for angular lost motion between them within limits to permit at least self-starting of said rotor in the wrong direction without turning said one part, said parts being coordinated so that said pawl part will override said ratchet teeth during normal drive of said rotor in the right direction, but will clash with one of said ratchet teeth on a wrong-directional start of said rotor and thereby induce reversal of the latter.

2. A directional drive control for a self-starting synchronous motor having a rotor, comprising a rotor-driven part; a rotary wheel part having ratchet teeth; a driving connection between these parts providing for angular lost motion between the latter within limits to permit at least self-starting of said rotor in the wrong direction without turning said wheel part; and a pawl so cooperating with said ratchet teeth as to override them during normal drive of said rotor in the right direction, but clash with one of them on a wrong-directional start of said rotor and thereby induce reversal of the latter.

3. A directional drive control for a self-starting synchronous motor having a rotor, comprising a wheel part having ratchet teeth; a cooperating pawl part, one of said parts being mounted for rotary movement relative to the other part so as to maintain their cooperative relationship; and a gear train drivingly connecting said rotor and said one part and having sufficient backlash to permit at least self-starting of said rotor in the wrong direction without turning said one part, and said parts being coordinated so that said pawl part will override said ratchet teeth during normal drive of said rotor in the right direction, but will momentarily lock with them on a wrong-directional start of said rotor and by rebound action induce reversal of the latter.

4. A directional drive control for a self-starting synchronous motor having a rotor, comprising a rotary wheel having ratchet teeth; a gear train drivingly connecting said rotor and wheel and having sufficient backlash to permit at least self-starting of said rotor in the wrong direction without turning said wheel; and a pawl so cooperating with said ratchet teeth as to override them during normal drive of said rotor in the right direction, but momentarily locking with them on a wrong-directional start of said rotor and by rebound action inducing reversal of the latter.

5. A directional drive control for a self-starting synchronous motor as set forth in claim 4, in which said gear train is of the reduction type with the slowest gear thereof carrying said wheel.

6. A directional drive control for a self-starting synchronous motor as set forth in claim 4, in which said gear train is of the reduction type and has several successive stages of reduction with the slowest gear of the train carrying said wheel.

7. A directional drive control for a self-starting synchronous motor having a rotor and a sole output shaft, comprising a wheel carried by said shaft and having ratchet teeth; a gear train drivingly connecting said rotor and shaft and having sufficient backlash to permit at least self-starting of said rotor in the wrong direction without turning said shaft; and a pawl so cooperating with said ratchet teeth as to override them during normal drive of said rotor in the right direction, but momentarily locking with them on a wrong-directional start of said rotor and by rebound action inducing reversal of the latter.

8. A directional drive control for a self-starting synchronous motor as set forth in claim 7, in which said gear train is of the reduction type with the slowest gear thereof carried by said shaft.

9. A directional drive control for a self-starting synchronous motor as set forth in claim 7, in which said gear train is of the reduction type and has several successive stages of reduction with the slowest gear of the train carried by said shaft.

10. A directional drive control for a self-starting synchronous motor having a rotor, comprising a rotary element driven by said rotor; a wheel part having ratchet teeth; a cooperating pawl part, one of said parts being rotatable coaxially of said element relative to the other part so as to maintain cooperative relationship between said parts, and said one part and element having a pin and slot-type driving connection affording sufficient angular lost motion between them to permit at least self-starting of said rotor in the wrong direction without turning said one part, and said parts being coordinated so that said pawl part will override said ratchet teeth during normal drive of said rotor in the right direction, but will temporarily lock with them on a wrong-directional start of said rotor until said pin and slot connection achieves by rebound action reversal of said rotor.

11. A directional drive control for a self-starting synchronous motor having a rotor, comprising a rotary element driven by said rotor; a wheel having ratchet teeth and being rotatable coaxially of said element and having with the latter a pin and slot-type driving connection affording sufficient angular lost motion between them to permit at least self-starting of said rotor in the wrong direction without turning said wheel; and a pawl so cooperating with said ratchet teeth as to override them during normal drive of said rotor in the right direction, but temporarily locking with them on a wrong-directional start of said rotor until said pin and slot connection achieves by rebound action reversal of said rotor.

12. A directional drive control for a self-starting synchronous motor having a rotor comprising a rotary shaft; first and second meshing gears turning with said rotor and shaft, respectively, and having backlash; a wheel with ratchet teeth rotatable on said shaft and having with said second gear a pin and slot-type driving connection affording together with the backlash in said gears sufficient angular lost motion between said wheel and rotor to permit at least self-starting of the latter in the wrong direction without turning said wheel; and a pawl so cooperating with said ratchet teeth as to override them during normal drive of said rotor in the right direction, but temporarily locking with them on a wrong-directional start of said rotor until said pin and slot connection achieves by rebound action reversal of said rotor.

13. A directional drive control for a self-starting synchronous motor as set forth in claim 12, in which said gears are of the reduction type with said second gear being the slower one.

14. A directional drive control for a self-starting synchronous motor having a rotor and a sole output shaft, comprising a train of gears having backlash and drivingly connecting said rotor and shaft; a wheel with ratchet teeth rotatable coaxially of one of said gears and having therewith a pin and slot-type driving connection affording, together with the backlash in the gearing intermediate said rotor and wheel, sufficient angular lost motion between said wheel and rotor to permit at least self-starting of the latter in the wrong direction without turning said wheel; and a pawl so cooperating with said ratchet teeth as to override them during normal drive of said rotor in the right direction, but temporarily locking with them on a wrong-directional start of said rotor until said pin and slot connection achieves by rebound action reversal of said rotor.

15. A directional drive control for a self-starting synchronous motor as set forth in claim 14, in which said gear train is of the reduction type with the fastest gear turning with said rotor.

16. A directional drive control for a self-starting synchronous motor as set forth in claim 14, in which said gear train is of the reduction type with several successive stages of reduction of which the first reduction stage includes a gear turning with said rotor, and said one gear forms part of said first reduction stage.

17. A directional drive control for a self-starting synchronous motor having a rotor, comprising a rotor-driven element; a wheel part having ratchet teeth; a cooperating pawl part, one of said parts being mounted for rotary movement relative to the other part so as to maintain their cooperative relationship; and a driving connection between said element and said one part providing for angular lost motion between them within limits to permit at least self-starting of said rotor in the wrong direction without turning said one part, said pawl part being pivoted intermediate its ends and the latter being so coordinated with said ratchet teeth that said ends will alternately be cammed by said teeth over the latter during normal drive of said rotor in the right direction, and either end will be in the path of and temporarily lock with the nearest ratchet tooth on a wrong-directional start of said rotor to induce reversal of the latter.

18. A directional drive control for a self-starting synchronous motor having a rotor comprising a rotor-driven part; a rotary wheel part having ratchet teeth; a driving connection between these parts providing for angular lost motion between the latter within limits to permit at least self-starting of said rotor in the wrong direction without turning said wheel part; and a double-ended pawl pivoted intermediate its ends and so coordinated with said ratchet teeth that said ends will alternately be cammed by said teeth over the latter during normal drive of said rotor in the right direction, and either end will be in the path of and temporarily lock with the nearest ratchet tooth on a wrong-directional start of said rotor to induce reversal of the latter.

19. A directional drive control for a self-starting synchronous motor having a rotor, comprising a train of drivingly connected rotary parts of which an endmost part is driven by said rotor, two of said train parts being independently turnable coaxially of each other and having a pin and slot-type driving connection affording sufficient angular lost motion between them to permit at least self-starting of said rotor in the wrong direction without turning the other endmost part of said train in the corresponding wrong direction; and means cooperating with said other endmost part to prevent running of the latter in said wrong direction but permit its running in the opposite direction, thereby to induce reversal of said rotor on a wrong-directional start of the same.

References Cited in the file of this patent

UNITED STATES PATENTS

| | | |
|---|---|---|
| 1,756,689 | Jenkins | Apr. 29, 1930 |
| 2,673,939 | Tetro | Mar. 30, 1954 |
| 2,722,615 | Morganson | Nov. 1, 1955 |

FOREIGN PATENTS

| | | |
|---|---|---|
| 506,273 | Great Britain | May 24, 1939 |
| 678,526 | Great Britain | Sept. 3, 1952 |